United States Patent [19]

Shiotani et al.

[11] Patent Number: 5,301,579
[45] Date of Patent: Apr. 12, 1994

[54] WORK RETAINING DEVICE FOR SCROLL-SAW MACHINE

[75] Inventors: Takeshi Shiotani; Kouichi Miyamoto, both of Tokyo, Japan

[73] Assignee: Limited Ryobi, Japan

[21] Appl. No.: 84,318

[22] Filed: Jun. 25, 1993

Related U.S. Application Data

[63] Continuation of Ser. No. 893,690, Jun. 4, 1992, abandoned.

[30] Foreign Application Priority Data

Jun. 7, 1991 [JP] Japan .......................... 3-042789[U]

[51] Int. Cl.⁵ .............................................. B26D 7/01
[52] U.S. Cl. ........................................... 83/98; 83/168; 83/440.2; 83/447; 83/450
[58] Field of Search ............... 83/447, 450, 98, 440.2, 83/700, 168; 112/235

[56] References Cited

U.S. PATENT DOCUMENTS

| | | | |
|---|---|---|---|
| 35,390 | 5/1862 | Richards | 83/450 X |
| 393,495 | 11/1888 | Yost | 83/447 |
| 899,567 | 9/1908 | Schubert | 83/450 X |
| 1,089,223 | 3/1914 | Jenkins | 83/450 X |
| 2,073,430 | 3/1937 | Tautz | 83/98 X |
| 2,538,456 | 1/1951 | Howe, Jr. | 83/440.2 X |
| 2,602,475 | 7/1952 | Andreae et al. | 83/450 X |
| 3,848,502 | 11/1974 | O'Neill | 83/440.2 X |
| 4,195,403 | 4/1980 | Gruber | 30/392 X |

Primary Examiner—Richard K. Seidel
Assistant Examiner—Kenneth E. Peterson
Attorney, Agent, or Firm—Brooks & Kushman

[57] ABSTRACT

A work retainer device for a scroll-saw in which a work retainer is mounted on an arm cover of an upper arm. Two brackets are formed at both distal ends of the arm cover to embrace the upper arm from both sides. Upright portions of a work retainer holding member are overlapped with the brackets. The brackets and the upright portions of the work retainer holding member are fastened to each other by a fastening unit including a screw rod which passes laterally through at least one of the overlapped portions of the bracket and the upright portions of the work retainer holding member. A longitudinal hole is formed in the upright portions of the work retainer holding member. The work retainer is fixed to a lower portion of the work retainer holding member.

17 Claims, 5 Drawing Sheets

WORK RETAINING DEVICE FOR SCROLL-SAW MACHINE

This is a continuation of copending application(s) Ser. No. 07/893,690 filed on Jun. 4, 1992, now abandoned.

BACKGROUND OF THE INVENTION

The present invention relates to a work retaining device for a scroll saw machine.

A work retainer has conventionally been provided on an arm cover for covering an upper arm of a scroll saw machine. There are several types of the retainers. For instance, in mounting a retainer, a round rod is vertically mounted on a side wall of the arm cover and a work retainer is mounted on a lower portion of the round rod so as to be rotatable in a horizontal direction. In another type, a proximal portion of the work retainer is fixed to a lower portion behind the scroll saw of the arm cover, and the work retainer is projected therefrom toward the scroll-saw.

However, with respect to the former conventional work retainer of the scroll saw machine, there is a fear that the work retainer would be rotated around the round rod to be brought into contact with the scroll-saw. Also, with respect to the latter conventional work retainer, since the long work retainer extends from the arm cover toward the scroll-saw, there is a fear that the work retainer would be deformed during the operation of the scroll saw machine, resulting in the contact with the scroll-saw.

In addition, an additional cover for covering the scroll-saw for safety protection has been sometimes mounted on the arm cover. However, if the workpiece is thick, a lower portion of the additional cover would be brought into contact with the workpiece to cause difficulty in operation.

SUMMARY OF THE INVENTION

In order to overcome the above noted or other defects, according to the present invention, there is provided a work retainer device for a scroll saw in which a work retainer is mounted on an arm cover of an upper arm, said work retainer device comprising at least one bracket formed at distal end of the arm cover, a work retainer holding member having at least one upright portion overlapped with the bracket and a holding portion supported by the upright portion for holding the work retainer and a fastening means which passes laterally through the overlapped portion of said bracket and said upright portion of said work retainer holding member for fastening the work retainer holding member at an adjustable position with respect to the bracket, a longitudinal hole being formed in one of said bracket and said upright portion of said work retainer holding member while the fastening means is supported by the other of them.

According to the invention, a safety cover for covering the scroll-saw may be mounted on the work retainer member.

Further objects, features and other aspects of this invention will be understood from the following detailed description of the preferred embodiments of &his invention with reference to the drawings.

DESCRIPTION OF THE PREFERRED EMBODIMENTS

An embodiment of the present invention will now be described with reference to FIGS. 1 through 5.

A scroll saw machine according to the invention includes a slantable table 1, a lower arm (not shown) which may be moved up and down by a motor (not shown) below the table 1, and an upper arm 2 which may be swung up and down above the table 1. The upper arm is connected through a connection member to a rear portion of the lower arm. A scroll saw 3 is tensioned between the front ends of the upper and lower arms so that the scroll saw 3 may reciprocatingly operate together with the motion of the upper and lower arms.

In this arrangement, during the reciprocating operation of the scroll saw 3 together with the motion of the upper and lower arms, the operator may shift the material, i.e., workpiece on and along the table 1 to perform the cutting along a curved line.

Figure 1:
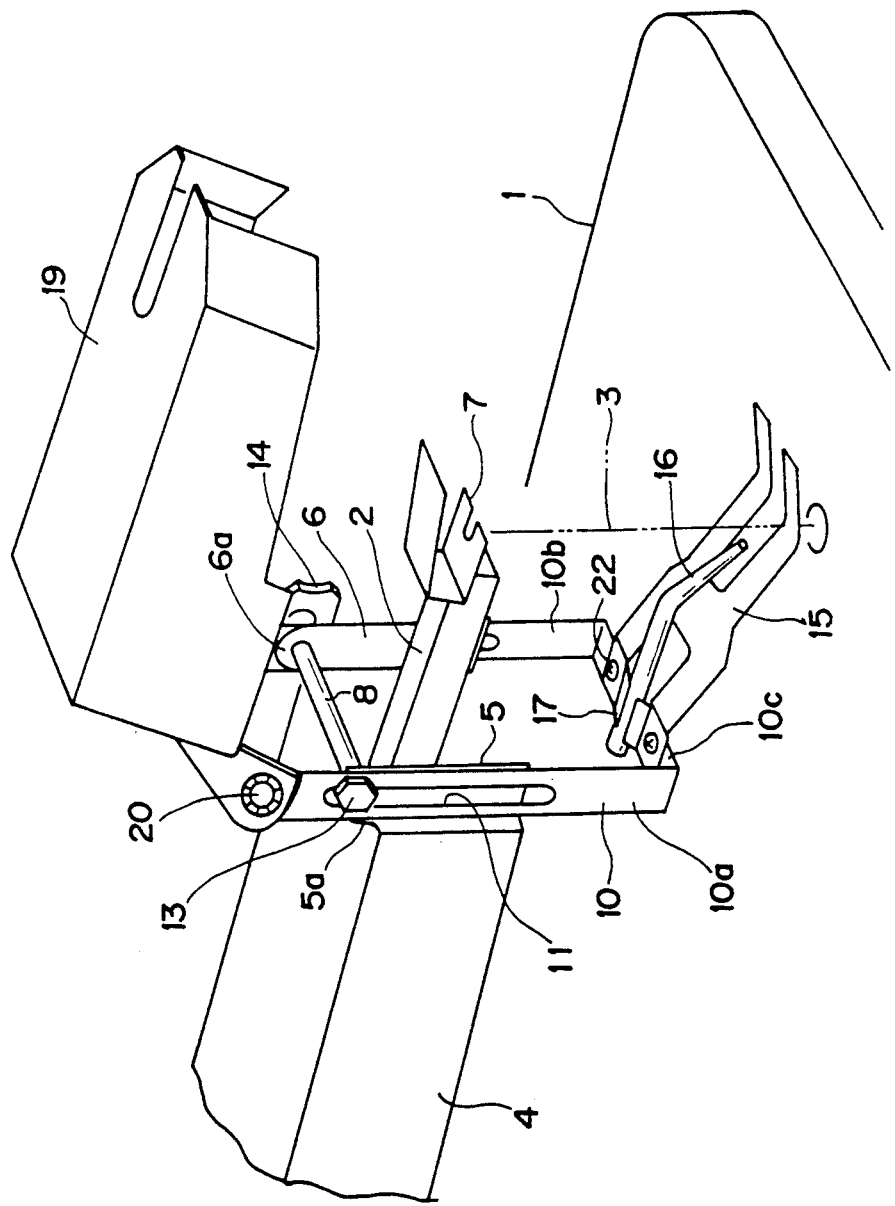
FIG. 1 is a perspective view showing a cutting section of a scroll saw machine provided with a work retainer device according to the invention.
Figure 2:
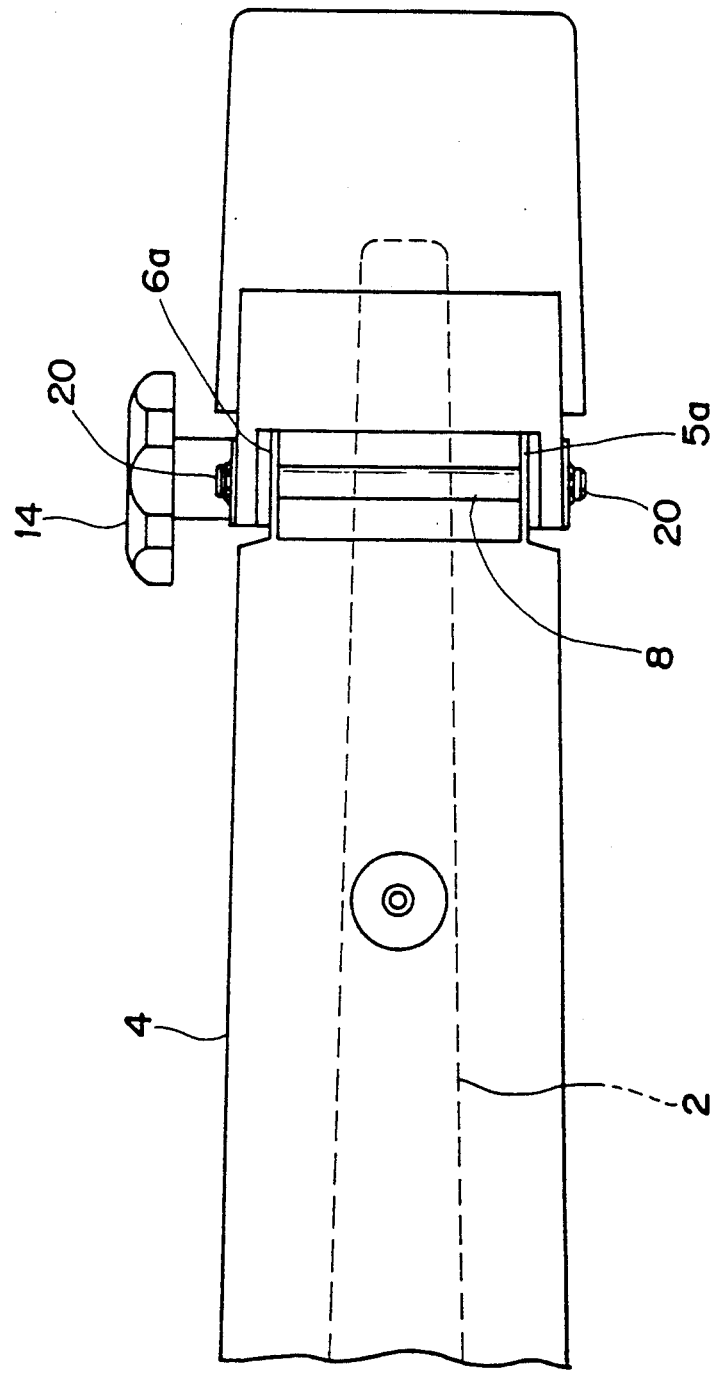
FIG. 2 is a plan view showing the cutting section shown in FIG. 1.
Figure 3:
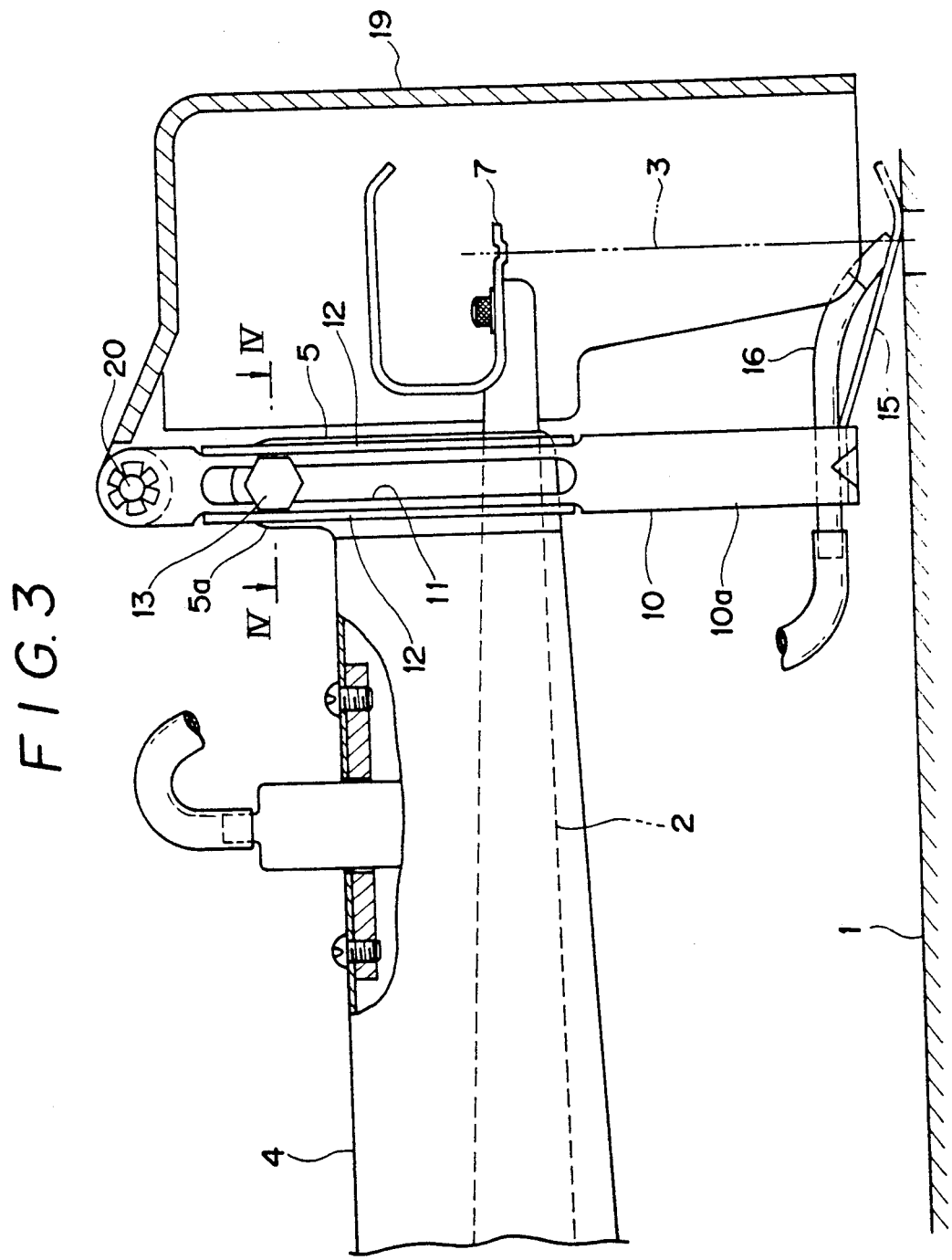
FIG. 3 is a fragmentary side elevational view showing the cutting section shown in FIG. 1.

As shown in FIGS. 1 to 3, the upper arm 2 is covered by an arm cover 4 which has a substantially inverted U-shaped cross section. A proximal end of the arm cover 4 is fixed to a stationary base (not shown) in a cantilever fashion. A pair of brackets 5 and 6 are provided to embrace the upper arm 2 at the distal end of the arm cover 4.

The front end of the upper arm 2 extends forwardly beyond the brackets 5 and 6 provided at the distal end of the arm cover 4. A scroll-saw fixing portion 7 for fixing the upper end of the scroll-saw 3 is provided at the front end of the upper arm 2.

Figure 4:
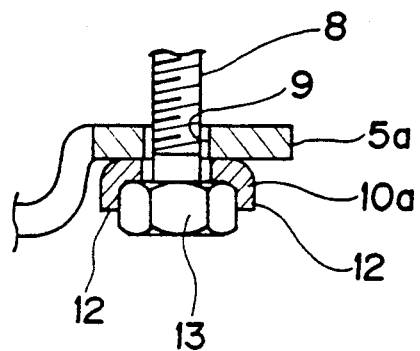
FIG. 4 is a cross sectional view taken along the line IV—IV of FIG. 3.

The brackets 5 and 6 extend vertically. The upper portions of the brackets 5 and 6 are projected upward beyond the top surface of the arm cover 4 to form two projecting portions 5a and 6a, respectively. The projecting portions 5a and 6a face each other. As best shown in FIG. 4, a hole 9 into which a screw rod 8 is to be inserted in a horizontal direction is formed in each of the projecting portions 5a and 6a.

Upright portions 10a and 10b of a work retainer holding member 10 having a substantially U shape are laid on and aligned with the brackets 5 and 6 from the outside. The upright portions 10a and 10b of the work retainer holding member 10 extend in the upward and downward directions of the brackets 5 and 6. Vertically longitudinal holes 11 having in the upright portions 10a and 10b overlapping with the brackets 5 and 6.

A pair of longitudinal linear projections 12 are provided along the edge portions of the longitudinal hole 11 formed in one of the upright portions 10a of the work retainer holding member 10. The screw rod 8 passes also through the longitudinal hole 11. Both the brackets 5 and 6 and the upright portions 10a and 10b of the work retainer holding member 10 are fastened together by the fastening means including the screw rod 8.

The fastening means includes the screw rod 8, a nut 13 fixed to one end of the screw rod 8, and a knob threadedly engaged with the other end of the screw rod 8. The nut 13 is inserted into the groove defined between the longitudinal linear projections 12 of the work retainer member 10 so that the nut 13 is not rotatable, whereas the knob 14 is brought into contact with an outer wall of the other upright portion 10b of the work retainer holding member 10.

With such an arrangement, by rotating the knob 14 in one rotational direction for releasing the knob 14 from the upright portion 10b, it is possible to disengage the upright portions 10a and 10b of the work retainer member 10 away from the brackets 5 and 6. After the release of the engagement, if the work retainer holding member 10 is shifted up and down, then the screw rod 8 is moved along the longitudinal holes 11. Then, the knob 14 is rotated in the opposite rotational direction at a desired position to be in pressing contact with the outer wall of the upright portion 10b so that the work retainer holding member 10 may again be fixedly engaged with the brackets 5 and 6.

As a reverse arrangement, it is possible to provide the longitudinal holes 11 in the brackets 5 and 6 rather than the work retainer holding member 10. In this case, the same effect may be ensured.

Also, the work retainer holding member 10 and the brackets 5 and 6 are overlapped with each other at the two positions on both sides. It is possible to modify this arrangement so that the screw rod 8 only passes through the one overlapping portion of the retainer holding member 10 and the bracket 5 and this overlapping portion is clamped by the nut 13 and the knob 14.

Figure 5:
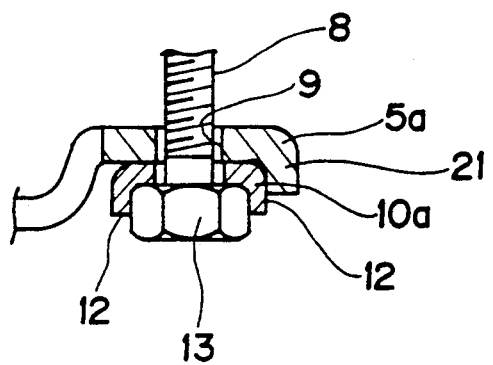
FIG. 5 is a cross sectional view similar to FIG. 4 but showing another embodiment of the invention.

Furthermore, as shown in FIG. 5, it is possible to provide a linear projection 21 for guiding the upright portion 10a of the work retainer along the front edge of the bracket 5. With this structure, it is possible to prevent the retainer holding member 10 from rotating.

As shown in FIG. 1, a lower portion 10c of the work retainer holding member 10 extends horizontally and a work retainer 15 is fixed to the center portion of the work retainer holding member 10 by two screws 22.

An end portion of the work retainer 15 is bifurcated so that the scroll-saw 3 may pass through a gap defined by the bifurcated portions. A portion between the parts of the work retainer 15 fixed to the bracket by the two screws 22 is divided into two sections which in turn depress a dust nozzle 16 against the lower bottom portion 10c of the work retainer holding member 10. The dust nozzle 16 projects toward the scroll-saw 3 from the lower portion 10c of the work retainer member 10, i.e., just behind the scroll-saw 3. For this reason, it is possible to feed air blow exactly toward the scroll-saw to always clean up both sides of the scroll-saw 3.

Figure 6:
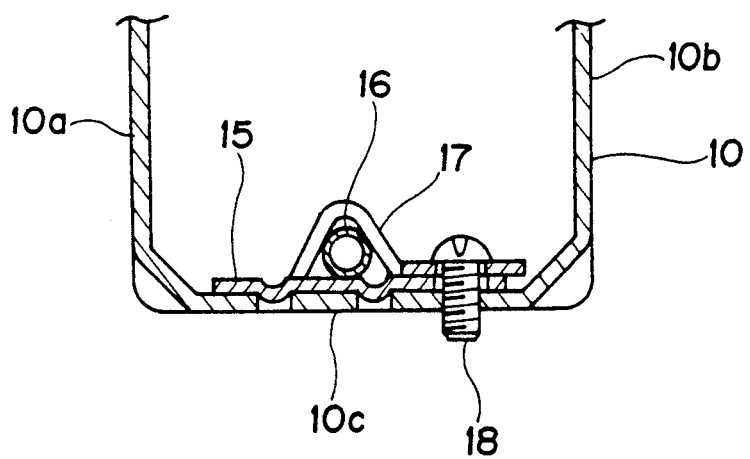
FIG. 6 is a vertical sectional view showing a dust nozzle fixing portion according to another embodiment of the invention.

Incidentally, as shown in FIG. 6, the fixture of the work retainer 15 and the dust nozzle 16 to the lower portion 10c may be modified so that this fixture is performed by using a discrete fastening member 17 and a screw 18. In this case, it is possible to adjust the position of the dust nozzle 16 and the work retainer 15 by loosening the screw 18.

As best shown in FIG. 3, a safety cover 19 for covering the scroll-saw 3 is mounted on the upper portion of the work retainer holding member 10 by a horizontal pin 20 to be angularly movable up and down. The safety cover 19 is in the form of a box so as to cover parts located forward of the arm cover 4 of the upper arm 2 and the scroll-saw part located upward of the work retainer 15. Since the safety cover 19 is moved together with the work retainer holding member 10, there is no fear that the lower portion of the safety cover 19 would be brought into contact with the workpiece.

The advantages of the work retainer device of the scroll saw machine will be explained.

As far as the fastening means is operated, the work retainer holding member 10 is fixed to the arm cover 4 in a stable manner, i.e., a both side support manner. In addition, the fixing position is at the front end of the arm cover 4. Accordingly, it is possible to prevent the work retainer 15 from contacting the scroll-saw during the machining operation without any fear that the work retainer 15 would be slanted or unstably swung.

In the case where the work retainer 15 is adjusted in position up and down in accordance with a change of thickness of the workpiece or any other factors, the knob 14 is rotated so as to release the engagement of the fastening means, and the work retainer holding member 10 may be moved up and down as desired. Then, the screw rod 8 moves along the longitudinal holes 11 and the rod 8 is fixed to a desired position. The knob 14 is again fastened so that the work retainer 15 is held at the desired position. Also, the dust nozzle 16 is moved together with the work retainer 15 so that the nozzle 16 may be always confronted with the scroll-saw 3.

The safety cover 19 is moved up and down together with the work retainer holding member 10 and the work retainer 15. The safety cover never contacts the workpiece.

The number of the upright portions 10a and 10b may be one. In this case, the work retainer 15 is supported by a bottom portion in a cantilever manner.

As described above, according to the invention, the work retainer holding member is supported to the arm cover in a both side support fashion and located in the vicinity of the scroll-saw to thereby eliminate a fear of undesired rotation or deformation. Accordingly, there is no fear that the work retainer holding member would be brought into contact with the scroll-saw during the machining operation.

Since the screw rod of the fastening means for the work retainer holding member may be moved up and down along the longitudinal holes, the work retainer may be moved along the longitudinal holes to thereby eliminate a fear that the work retainer would be shifted laterally or would be deformed. Accordingly, it is possible to more effectively eliminate the contact between the work retainer and the scroll-saw.

Since the safety cover for covering the scroll-saw is mounted on the work retainer holding member, the safety cover is also moved up and down as the work retainer is moved up and down. Accordingly, even if the workpiece is thick, there is no fear that the lower portion of the safety cover would be brought into contact with the workpiece. Thus, it is possible to perform the cutting operation smoothly.

What is claimed is:

1. A work retainer device for scroll-saw having an upper arm assembly including an arm cover, cantileverdly extending generally horizontally, said work retainer device comprising:

two laterally spaced apart brackets formed on a distal end of the arm cover;

a work retainer holding member having two upright portions respectively overlapping said two upright brackets and having a lower portion provided at lower ends of the two upright portions to form a generally U-shape member;

a projection provided on at least one of said brackets to prevent the work retainer holding member from rotating while allowing limited relative vertical adjustment;

a work retainer attached to the work retainer holder member lower portion for engaging an upper surface of a work piece to be cut;

a fastening means which passes laterally through an overlapped portion of a bracket and an upright portion of said work retainer holding member for fastening the work retainer holding member at a vertically adjustable position;

a longitudinal hole being formed in at least one of said bracket and said upright portion of said work retainer holding member while the fastening means is supported by the other bracket; and a dust nozzle held by the lower portion of the work retainer holding member for keeping said scroll-saw clean, wherein said work retainer is bifurcated at a free end so that said dust nozzle is directed to a gap defined by the bifurcated portions of said work retainer;

wherein the overlapping upright brackets, the U-shape work retainer and the fastening means cooperate to from a rigid rectangular frame structure supporting the work retainer and the nozzle.

2. A work retainer device according to claim 1, wherein a safety cover for covering said scroll-saw is mounted on said work retaining holding member.

3. A work retainer device according to claim 2, further comprising a means for angularly movably mounting said safety cover on said work retainer holding member.

4. A work retainer device according to claim 1, further comprising a dust nozzle held by the lower portion of the work retainer holding member for keeping said scroll-saw clean, wherein said work retainer is bifurcated at a free end so that said dust nozzle is directed to a gap defined by the bifurcated portions of said work retainer.

5. A work retainer device according to claim 1, wherein said bracket has, at its upper end, a projection portion for supporting the fastening means.

6. A work retainer device according to claim 1, wherein one of said upright portions has a pair of linear projections, at its edges, along said longitudinal hole and the fastening means includes a screw rod and a nut fitted to the screw rod, whereby said nut is engaged with said pair of linear projections to thereby ensure fastening operation of said fastening means.

7. A work retainer device for scroll-saw having an upper arm assembly including an arm cover, cantileverdly extending generally horizontally, said work retainer device comprising:

a bracket, formed on a distal end of said arm cover, and extending in a vertical direction;

a work retainer holding member having an upright portion overlapped with said bracket and a holding portion spaced therefrom;

a work retainer attached to the work retainer holding portion for engaging an upper surface of a work piece to be cut;

a single fastening means including a screw rod and a nut fitted to the screw rod, which passes horizontally in a lateral direction across the arm cover through the overlapped portion of said bracket and said upright portion of said work retainer holding member for fastening the work retainer holding member at a vertically adjustable position;

a projection provided on said bracket to prevent the work retainer holding member from rotating while allowing limited vertical movement thereof; and a longitudinal hole being formed in one of said bracket and said upright portion of said work retainer holding member while the fastening means is supported by the other;

wherein one of said upright portions has a pair of linear projections, at its edges, along said longitudinal hole, whereby said nut is engaged with said pair of linear projections to thereby ensure fastening operation of said fastening means.

8. A work retainer device according to claim 7, wherein said bracket has, at its distal end, a linear projection for guiding an upright portion of the work retainer holding member.

9. A work retainer device according to claim 7, wherein said bracket has, at its upper end, a projecting portion for supporting the fastening means.

10. A work retainer device according to claim 7, wherein a safety cover for covering said scroll-saw is mounted on said work retaining holding member.

11. A work retainer device according to claim 10, further comprising a means for angularly movably mounting said safety cover on said work retainer holding member.

12. A work retainer device according to claim 7, further comprising a dust nozzle held by the lower portion of the work retainer holding member for keeping said scroll-saw clean, wherein said work retainer is bifurcated at a free end so that said dust nozzle is directed to a gap defined by the bifurcated portions of said work retainer.

13. A work retainer device for a scroll-saw having an upper arm assembly including an arm cover, cantileverdly extending generally horizontally, said work retainer device comprising:

two laterally spaced apart brackets formed on a distal end of the arm cover;

a work retainer holding member having two upright portions respectively overlapping said two upright brackets and having a lower portion provided at lower ends of the two upright portions to form a generally U-shape member;

a projection permanently attached on at least one of said brackets to prevent the work retainer holding member from rotating while allowing limited relative vertical adjustment;

a work retainer attached to the work retainer holder member lower portion for engaging an upper surface of a work piece to be cut;

a single fastening means which passes laterally through the overlapped portions of each of said brackets and each of said upright portions of said work retainer holding member for fastening the work retainer holding member at a vertically adjustable position; and a longitudinal hole being formed in at least one of said bracket and said upright portion of said work retainer holding member while the fastening means is supported by the other;

whereby the single fastener means is fastened such that the overlapping upright brackets, the U-shaped work retainer and the fastening means cooperate to from a rigid rectangular frame structure for supporting the work retainer.

14. A work retainer device according to claim 13, wherein a safety cover for covering said scroll-saw is mounted on said work retaining holding member.

15. A work retainer device according to claim 14, further comprising a means for angularly movably mounting said safety cover on said work retainer holding member.

16. A work retainer device according to claim 13, further comprising a dust nozzle held by the lower portion of the work retainer holding member for keeping said scroll-saw clean, wherein said work retainer is bifurcated at a free end so that said dust nozzle is directed to a gap defined by the bifurcated portions of said work retainer.

17. A work retainer device according to claim 13, wherein said fastening means comprises a screw rod and a nut fitted to the screw rod.

* * * * *

UNITED STATES PATENT AND TRADEMARK OFFICE
CERTIFICATE OF CORRECTION

PATENT NO. : 5,301,579
DATED : April 12, 1994
INVENTOR(S) : Shiotani et al.

It is certified that error appears in the above-identified patent and that said Letters Patent is hereby corrected as shown below:

Column 1, line 64, replaced "&his" with --this--;

Column 2, line 62, after the word "having", insert --a width larger than a diameter of the screw rdod 8 are formed--;

Column 5, line 57, claim 7, after the phrase "device for", insert --a--.

Signed and Sealed this

Twenty-third Day of August, 1994

Attest:

BRUCE LEHMAN

*Attesting Officer*     *Commissioner of Patents and Trademarks*